Jan. 3, 1956  A. M. CHAMBERS, JR., ET AL  2,729,475
DIAPHRAGM TYPE MECHANICAL SEAL
Filed Feb. 16, 1953
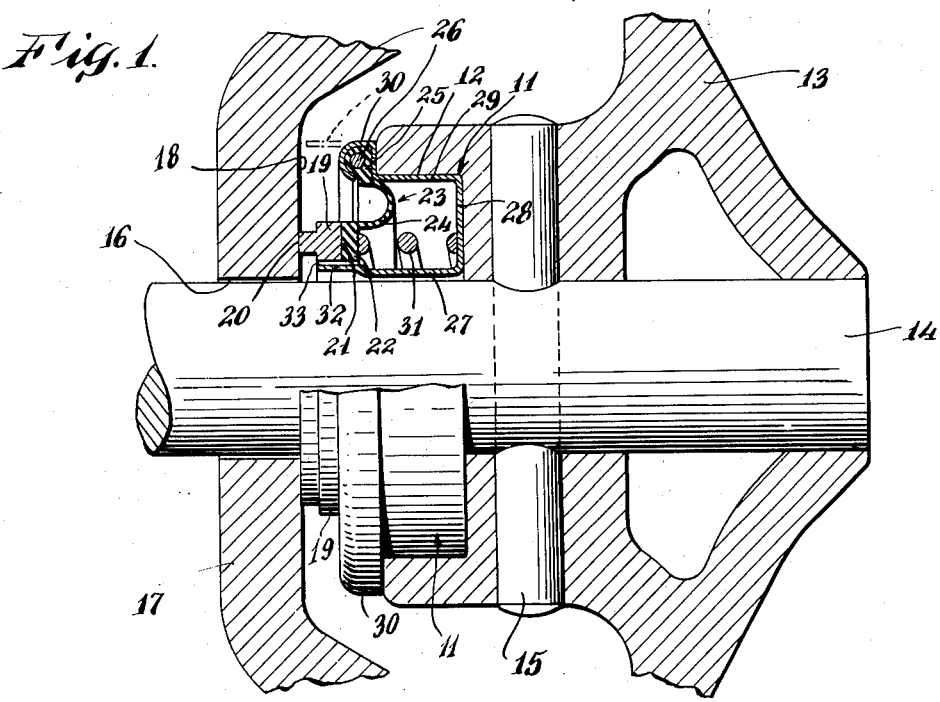
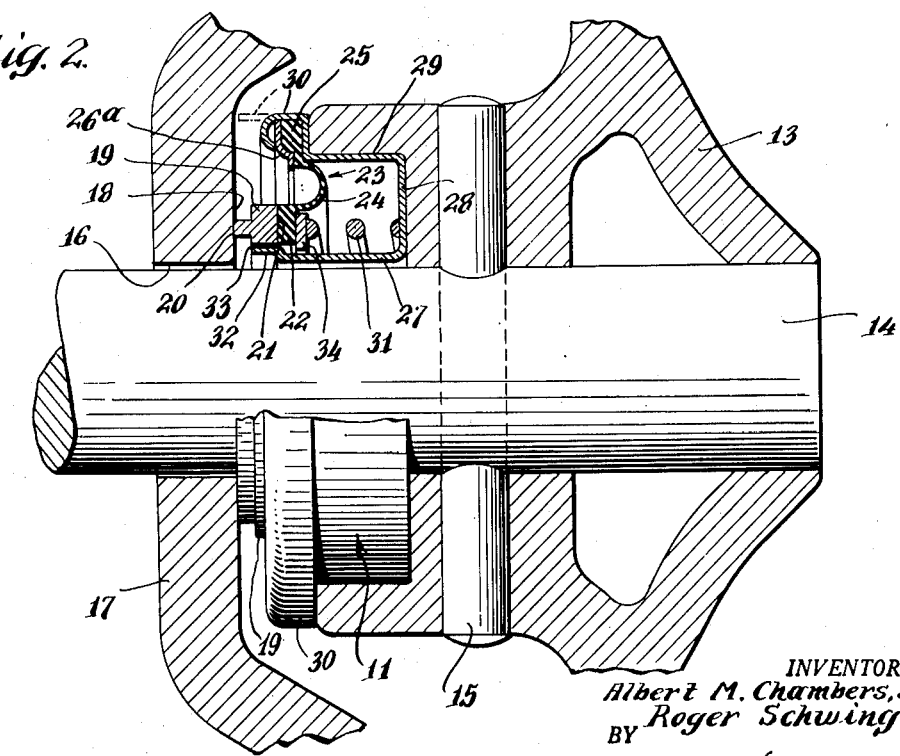
INVENTORS.
Albert M. Chambers, Jr.
BY Roger Schwing
Robert Henderson
ATTORNEY.

United States Patent Office 2,729,475
Patented Jan. 3, 1956

2,729,475

DIAPHRAGM TYPE MECHANICAL SEAL

Albert M. Chambers, Jr., and Roger Schwing, Palmyra, N. Y., assignors to The Garlock Packing Company, Palmyra, N. Y., a corporation of New York Application February 16, 1953, Serial No. 337,066

2 Claims. (Cl. 286—11)

This invention relates generally to mechanical seals such as are employed for effecting a seal between a rotary shaft and a shaft opening in a machine casing through which the shaft extends. Many such rotary seals include a thin metal shell within which the operating parts of the device are arranged, and those parts usually include a relatively thin, flexible, annular diaphragm by which a rotary sealing ring is effectively yet flexibly sealed to the shell. More particularly, the present invention relates to improved means by which a peripheral portion of such a flexible diaphragm is clamped to a portion of the metal shell.

It is quite common to clamp the thin, outer margin of such a flexible diaphragm to a shell portion but, because of the thinness and softness of the rubber or rubber-like material of which such diaphragms normally are made, it is quite difficult to effect such clamping. Usually, it has been necessary to provide several clamping rings which, when brought together in proper association, hold the marginal portion of the rubber sealing element tightly clamped to the shell. Even then, however, the clamped marginal rubber sometimes works loose from the clamping rings, making it necessary to replace the sealing device.

It is an important object of this invention to provide simpler but, nevertheless, effective means for clamping the outer margin of a flexible, annular diaphragm to a shell of a mechanical seal in such manner that the diaphragm will not work loose from the shell's grip thereon.

Another important object of the invention is the provision of an improved annular diaphragm for a mechanical seal which lends itself to being effectively gripped marginally by a rolled-in marginal portion of a metal shell of such a seal.

These and other objects are accomplished by the present invention of which two embodiments are shown in the accompanying drawing for illustrative purposes without, however, limiting the invention to those particular embodiments.

In the drawing:

Figure 1 is a side view of a preferred embodiment of mechanical seal, according to the present invention, shown in association with fragmentary portions of a shaft, an impeller fixed upon the inner end of the shaft, and a machine or pump casing through which the shaft extends; the impeller, the pump casing and the upper part of the sealing device being shown in axial section and the lower part of the seal being shown in side elevation.

Fig. 2 is a sectional view, substantially similar to Fig. 1, but showing a second embodiment of mechanical seal according to this invention.

Referring to Fig. 1, the seal comprises an annular, cup-shaped shell 11, preferably of sheet metal, fitted fluid-tightly into an annular recess 12 in the outer end of an impeller or other similar rotating part 13, which is fluid-tightly fitted upon the inner end of a shaft 14 and held thereon against rotation by a pin 15. The shaft extends outwardly through an opening 16 in a machine or pump casing 17.

In order to prevent the escape of fluid from within the pump casing, it is necessary to provide a seal between the shell and the flat, inner surface 18 of the pump casing.

For this purpose, an annular portion of the surface 18, surrounding the shaft 14, may advantageously be formed with a very smooth finish, and a wear or sealing ring 19, of suitable metal or other suitable rigid material, may be formed with a flat, outer end surface 20 to effect a sliding rotary seal with the machine casing surface 18. The sealing ring 19, preferably, is formed with an enlarged body portion having an inner flat surface 21, which preferably is cemented to the adjacent outer surface of an inner flange 22 of a relatively thin, annular, flexible diaphragm 23 of rubber, synthetic rubber, or other suitable, relatively soft, flexible material. Extending outwardly from flange 22 is a relatively thin web 24 which, in cross-section, is in the shape of an axially outwardly facing U, and at the outer margin of the web 24 is a marginal portion which is to be clamped to the shell 11. It is at this point where trouble has been encountered in the past in effecting a satisfactory connection of the diaphragm to the shell. This difficulty, however, has been obviated by the present invention.

According to this invention, the diaphragm's marginal portion, identified generally as 25, is in the form of a thickened portion or bead which is substantially circular in cross-section and which, in the embodiment of Fig. 1, has a reinforcing wire ring 26 embedded therein. This ring may be either a split ring or a non-split continuous ring, as in either case it would afford the support necessary to permit the clamping of the bead to the shell 11.

The shell 11 has integral walls as follows: an inner tubular wall 27, which extends closely about the shaft 14 although not necessarily in contact therewith, a radial or bottom wall 28, which seats against the bottom of the annular recess 12, an outer cylindrical wall 29, which holds the shell fluid-tightly into the recess 12, and an offset, angular extension 30 which abuts the adjacent end of the impeller 13, thus limiting the axial movement of the shell into the recess 12 or into a cylindrical space if no such recess is provided.

The extension 30, during the assembling of the seal, extends outwardly as a cylindrical flange, as shown in broken lines in the drawing. With the shell in that condition, the spring 31, the flexible diaphragm 23, and the wear ring 19 are moved into the shell, after which the portion of the extension 30 which is shown in broken lines is rolled inwardly and around the diaphragm's bead or marginal portion 25 to its condition as shown in full lines in which it firmly grips the bead against any possible accidental dislodgement.

It may be understood that, because of the softness of the rubber of which the flexible diaphragm is made, if one were to attempt to roll-in the dotted-line portion of the extension 30, as hereinbefore described, without having the reinforcing wire ring 26 in the bead 25, said bead would be deformed and pushed radially inwardly, as the rolling action of the shell metal proceeds, so that a proper clamping effect would not be achieved. In other words, the soft bead 25, without the reinforcing wire ring 26, would not afford an adequate base upon which the shell margin could be rolled. However, with the ring 26 associated with the bead, said ring opposes inward deformation of the bead so that the described rolling-in of the shell is readily accomplished and effects a very effective, fluid-tight connection between the shell and the diaphragm.

Although not essential, it is preferred to have the outer end margin of the tubular shell wall 27 struck up in the form of lugs 32 at one or possibly several circumferential points and to provide axial grooves 33 in the adjacent inner periphery of the wear ring 19, within which grooves the lugs 32 may slide axially with relative freedom.

Thus, the lugs 32 constrain the wear ring 19 to turn with the shell and, of course, with the impeller and the shaft, while nevertheless permitting said ring to ride axially with vibrations or other irregularities of operation of the device while maintaining, through the compressive force of spring 31, a continuous, effective, sliding sealing engagement with the internal surface 18 of the pump casing.

The embodiment of this invention illustrated in Fig. 2 differs from that shown in Fig. 1 chiefly in two respects. First, instead of providing reinforcing ring 26, associated with the outer marginal portion 25 of the diaphragm, the said outer marginal portion is merely enlarged or thickened as shown in Fig. 2; and a separate ring 26a, of sheet metal with an inner, side-face, annular concavity which is approximately complementally shaped relatively to the enlarged marginal portion of the diaphragm, is utilized as a base upon which the outer margin of the shell may be rolled.

With the metal ring 26a thus functioning as a base for the rolling-in of the shell, such rolling may be accomplished without distorting the marginal portion of the diaphragm inwardly. It may be seen from Fig. 2 that, as the shell is rolled in, the inner side face of the ring 26a intimately engages the adjacent side face of thickened marginal portion 25 and that an annular portion of said ring extends arcuately to a position radially inwardly of and in radial abutment with said portion 25 and into clamping relationship with a portion of the diaphragm which is considerably thinner than portion 25 and constitutes a juncture between the latter and the diaphragm's web 24. Thus, the ring 26a presents an inner side face with a concave surface which exerts a material influence for the purpose of preventing radial, inward dislodgment of thickened marginal portion 25 of the diaphragm from the shell.

The structure of Fig. 2 also differs from that of Fig. 1 in that the spring 31, instead of pressing directly upon the radial flange 22 of the diaphragm, presses upon a flat metal washer 34 which rests against the adjacent side of the flange 22. This washer has a smaller inside diameter than the outside diameter of the tubular shell wall 27 at the lug or lugs 32 and, therefore, it cannot become dislodged from the device in any ordinary usage thereof. In this way, the compressive force of the spring 31 cannot push the diaphragm outwardly with respect to the shell to any excessive extent. This possibility is present in the structure of Fig. 1, but it should be obvious that in that structure the spring 31 may be one which is under such limited compression that it would not ordinarily push the diaphragm and the rigid sealing ring too far out of the shell.

Without attempting to visualize all possible ways in which the present inventive concept may be employed, it may be noted that the shell, instead of being press-fitted into an impeller or other element which rotates with the shaft, may be press-fitted into a recess at a shaft opening in a machine casing and the wear ring 19 may effect a sliding seal with a flat surface on a shaft extending through said opening or on an element fixed to the shaft. Also, all parts of the device may be reversely arranged, in a radial sense, from their relationship shown in the drawing so that the inner shell wall 27 could be press-fitted directly upon the shaft and, in the latter arrangement, if desired, the inner periphery instead of the outer periphery of the diaphragm could be thickened and supported or reinforced and be held by the outwardly rolled margin of the wall 27.

It should be apparent that the inventive concept underlying the present improvement may be utilized in numerous structures other than those illustrated and described herein without, however, departing from the invention as set forth in the following claims.

What we claim is:

1. A diaphragm type mechanical seal comprising an annular cup-shaped shell adapted for fixed, fluid-tight association with one of two approximately coaxial, relatively rotatable machine elements, an annular diaphragm of soft, flexible material having a wear ring at one periphery adapted to effect a sliding seal with an annular surface on the other of said machine elements and a thickened annular portion at its other periphery, and a relatively rigid supporting ring in intimate side-by-side association with said thickened peripheral portion; the shell having an annular, radially facing, marginal channel within which said thickened peripheral portion and said supporting ring are fluid-tightly gripped, and the said supporting ring being of complemental shape relative to said thickened peripheral portion and having a concave inner side face, one circumferential part of which is in axial alignment with said thickened peripheral portion and another circumferential part of which is in radial alignment with said thickened peripheral portion, thereby being adapted to oppose radial and axial deformation of said thickened peripheral portion and to oppose dislodgment of the latter from said channel.

2. A diaphragm type mechanical seal for effecting a seal between a circular machine-casing opening and a rotary element having a first portion extending into said opening and a second, enlarged portion having an annular recess facing axially toward said opening, said seal comprising an annular, cup-shaped shell adapted for fixed, fluid-tight association with said second portion, within said recess; an annular diaphragm of relatively soft, flexible material having a wear ring at its inner periphery adapted to effect a sliding seal with an annular surface of the machine casing which extends about said first portion, and said diaphragm having a thickened outer, annular, peripheral portion; and the seal further including a relatively rigid supporting ring in intimate side-by-side association with said thickened peripheral portion; the shell having an annular, radially inwardly facing, marginal channel within which said thickened peripheral portion and said supporting ring are fluid-tightly gripped, and the said supporting ring being of complemental shape relative to said thickened peripheral portion and having a concave inner side face, one circumferential part of which is in axial alignment with said thickened peripheral portion and another circumferential part of which is in radial alignment with and radially inwardly of said thickened peripheral portion, thereby being adapted to oppose radial and axial deformation of said thickened peripheral portion and to oppose dislodgment of the latter from said channel.

References Cited in the file of this patent

UNITED STATES PATENTS

| 1,931,723 | Fageol et al. | Oct. 24, 1933 |
| 2,101,013 | Leister et al. | Nov. 30, 1937 |
| 2,377,452 | Reynolds | June 5, 1945 |
| 2,385,420 | Meyer | Sept. 25, 1945 |
| 2,497,704 | Voytech | Feb. 14, 1950 |
| 2,572,422 | Agger | Oct. 23, 1951 |
| 2,608,425 | Krug | Aug. 26, 1952 |
| 2,650,117 | Chambers et al. | Aug. 25, 1953 |
| 2,701,154 | Dolhun | Feb. 1, 1955 |

FOREIGN PATENTS

| 458,460 | Canada | July 26, 1949 |